US006219833B1

(12) United States Patent
Solomon et al.

(10) Patent No.: US 6,219,833 B1
(45) Date of Patent: Apr. 17, 2001

(54) METHOD OF USING PRIMARY AND SECONDARY PROCESSORS

(75) Inventors: Charles Reed Solomon; Andrea Olgiati, both of Bristol (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/209,778

(22) Filed: Dec. 11, 1998

(30) Foreign Application Priority Data

Dec. 17, 1997 (EP) .................................................. 97310249

(51) Int. Cl.[7] .............................. G06F 9/45; G06F 15/82
(52) U.S. Cl. ..................................... 717/5; 717/9; 712/15; 712/18; 712/23; 712/34; 712/201
(58) Field of Search .............................. 717/5, 9; 712/15, 712/10, 17, 18, 34, 36, 201, 23

(56) References Cited

U.S. PATENT DOCUMENTS

| | | | |
|---|---|---|---|
| 5,600,845 | * | 2/1997 | Gilson ..................................... 712/39 |
| 5,752,035 | * | 5/1998 | Trimberger ............................... 717/5 |
| 5,802,290 | * | 9/1998 | Casselman ............................. 709/201 |
| 6,009,273 | * | 12/1999 | Ayers et al. .............................. 717/9 |
| 6,077,315 | * | 6/2000 | Greenbaum et al. ..................... 717/9 |

FOREIGN PATENT DOCUMENTS

0926594A1 * 6/1999 (EP) .

OTHER PUBLICATIONS

Wazlowsji et al., "PRISM–II Complier and Architecture," Proceedings, IEEE Workshop on FPGAs for Custom Computing Machines, Apr. 5–7, 1993, pp. 9–16.*

Brian Box, "Field Programmable Gate Array Based Reconfigurable Preprocessor," Proceedings, IEEE Workshop on FPGAs for Custom Computing Machines, Apr. 10–13, 1994, pp. 40–48.*

Wirthlin et al., "The Nano Processor: a Low Resource Reconfigurable Processor," Proceedings, IEEE Workshop on FPGAs for Custom Computing Machines, Apr. 10–13, 1994, pp. 23–30.*

(List continued on next page.)

*Primary Examiner*—Mark R. Powell
*Assistant Examiner*—Tuan Q. Dam

(57) ABSTRACT

The compilation of source code to a primary and a secondary processor. The method relates to reconfigurable secondary processors, and is especially relevant to secondary processors which can be reconfigured to some degree during execution of code. Selective extraction of dataflows from the source code is followed by transformation of the extracted dataflows into trees. The trees are then matched against each other to determine minimum edit cost relationships for transformation of one tree into another, where these minimum edit cost relationships are determined by the architecture of the secondary processor. A group or a plurality of groups of dataflows is determined on the basis of said minimum edit cost relationships and for each group a generic dataflow capable of supporting each dataflow in that group is created. The generic dataflow or dataflows is then used to determine the hardware configuration of the secondary processor; and calls to the secondary processor for said group or plurality of groups of dataflows are substituted into the source code. The resultant source code is compiled to the primary processor.

The resulting efficient configuration thus reduces either the expense of reconfiguration (in a field programmable array), or the silicon area (in an application specific integrated circuit).

19 Claims, 9 Drawing Sheets

OTHER PUBLICATIONS

Wo et al., "Compiling to the gate Level for a Reconfigurable Co–Processor," Proceedings, IEEE Workshop on FPGAs for Custom Computing Machines, Apr. 10–13, 1994, pp. 147–154.*

"A Constrained Edit Distance Between Unordered Labeled Trees" by Kaizhong, Zhang, published in *Algorithmica*, Springer–Verlag, USA, vol. 15, No. 3, Mar. 1996, ISSN 0178–4617, pp. 205–222, XP002067144.

"Processor Reconfiguration Through Instruction–Set Metamorphosis" by Peter M.Athanas and Harvey F. Silverman, published in *Computer*, vol. 26, No. 3, Mar. 1993, ISSN 0018–9162, USA, pp. 11–18, XP002067143.

"The COSYMA Environment for Hardware/Software Cosynthesis of Small Embedded Systems" by R. Ernst, J. Henkel, Thomas Benner, W. Ye, U. Holtman, D. Herrmann, M. Trawny, published in *Microprocessors and Microsystems*, vol. 20, No. 3, May 1996, pp. 159–166, XP004032563.

"Compiling to the Gate Level for a Reconfigurable Co–Processor" by David Wo and Kevin Forward, published in Proceedings IEEE Workshop on FPGAs for Custom Computing Machines, (CAT. No. 94TH0611–4), Napa Valley, CA, USA, Apr. 10–13, 1994, ISBN 0–8186–5490–2, 1994, Los Alamitos, CA, USA, IEEE Comput. Soc. Press, USA, pp. 147–154, XP002067142.

"Basic Graph Concepts" by Michael Wolf, published in *High Performance Compilers for Parallel Computing*, Addison–Wesley, Redwood City, 1996, Chapter 3, pp. 49–56.

"Selecting and Emitting Instructions" by Christopher W. Frann and David R. Hanson, published in *A Retargetable C Complier: Design and Implementation*, Benjamin/Cummings Publishing Co., Inc., Redwood City, 1995, Chapter 14, pp. 373–407.

A C++ Compiler for FPGA Custom Execution Units Synthesis by Christian Iseli and Eduardo Sanchez, presented at IEEE Symposium on FPGAs for custom Compiling Machines, Napa, California, Apr., 1995.

"Run–Time Programming Method for Reconfigurable Computer" Steve Casselman, from Reconfigurable Logic Roundtable Discussion, Internet site operated by S.B. Associates, Inc., Los Galos, CA.

"Two–Level Hardware/Software Partitioning Using CoDe–X" by Reiner W. Hartenstein, Jurgen Becker, Rainer Kress, from International IEEE Symposium on Engineering of Computer Based Systems (ECBS), Friedrichshaffer, Germany, Mar., 1996.

"A Functional Reconfigurable Architecture and Compiler for Adaptive Computing" by Peter M. Athanas, published in *IEEE*, Mar., 1993, pp. 49–55.

"An Adaptive Hardware Machine Architecture and Compiler for Dynamic Processor Reconfiguration" by Peter M. Athanas and Harvey F. Silverman, published in *IEEE*, Mar., 1997, pp. 397–401.

Technology Mapping for FPGA Using Generalized Functional Decomposition, by Kuo Hua Wang, Ting Ting Hwang, Cheng Chen, National Tsing Hua University, Taiwan, pp. 605–610.

* cited by examiner

Mapping:
(5,9)
(4,6)
(3,5)
(2,4)
(1,1)

METHOD OF USING PRIMARY AND SECONDARY PROCESSORS

FIELD OF THE INVENTION

The present invention relates to the compilation and execution of source code for a processor architecture consisting of a primary processor and one (or more) secondary processors. The invention is particularly, though not exclusively, relevant to the architectures employing a reconfigurable secondary processor.

BACKGROUND OF THE INVENTION

A primary processor—such as a Pentium processor in a conventional PC (Pentium is a Trade Mark of Intel Corporation)—has evolved to be versatile, in that it is adapted to handle a wide range of computational tasks without being optimised for any of them. Such a processor is thus not optimised to handle efficiently computationally intensive operations, such as parallel sub-word tasks. Such tasks can cause significant bottlenecks in the execution of code.

An approach taken to solve this problem is the development of integrated circuits specifically adapted for particular applications. These are known as ASICs, or application-specific integrated circuits. Tasks for which such an ASIC is adapted are generally performed very well: however, the ASIC will generally perform poorly, if at all, on tasks for which it is not configured. Clearly, a specific IC can be built for a particular application, but this is not a desirable solution for applications that are not central to the operation of a computer, or are not yet determined at the time of building the computer. It is thus particularly advantageous for an ASIC to be reconfigurable, so that it can be optimized for different applications as required. The commonest form of architecture for such devices is the field programmable gate array (FPGA), a fine-grained processor structure which can be configured to have a structure which is suited to any given application. Such structures can be used as independent processors in suitable contexts, but are also particularly appropriate to use as coprocessors. Such configurable coprocessors have the potential to improve the performance of the primary processor. For particular tasks, code run inefficiently by the primary processor can be extracted and run more efficiently in an adapted coprocessor which has been optimised for that application. With continued development of such "application-specific" secondary processors, the possibility of improving performance by extracting difficult code to a custom coprocessor becomes more attractive. A particularly important example in general computing is the extraction of loop bodies in image handling.

To obtain the desired efficiency gains, it is necessary to determine as effectively as possible. how code is to be divided between primary and secondary processors, and to configure the secondary processor for optimal execution of its assigned part of the code. One approach is to mark the code appropriately on its creation for mapping to coprocessor structures. In "A C++ compiler for FPGA custom execution units synthesis", Christian Iseli and Eduardo Sanchez, EEE Symposium on FPGAs for Custom Computing Machines, Napa, California, April 1995, an approach is employed which involves mapping of C++ to FPGAs in VLIW (Very-Long Instruction Word) structures after appropriate tagging of the initial code by the programmer. This approach relies on the initial programmer making a good choice of code to extract initially.

An alternative approach is to assess the initial code to determine which the most appropriate elements to direct to the secondary processor will be "Two-Level Hardware/Software Partitioning Using CoDe-X", Reiner W. Hartenstein, Jügen Becker and Rainer Kress, in Int. IEEE Symposium on Engineering of Computer Based Systems (ECBS), Friedrichshafen, Germany, March 1996, discusses a codesign tool which incorporates a profiler to assess which parts of an initial code are suitable for allocation to a coprocessor and which should be reserved for the primary processor. This is followed by an iterative procedure allowing for compilation of a subset of C code to a reconfigurable coprocessor architecture so that the extracted code can be mapped to the coprocessor. This approach does expand the usage of secondary processors, but does not fully realize the potential of reconfigurable logic.

Comparable approaches have been proposed in the BRASS research project at the University of Berkeley. An approach discussed in "Datapath-Oriented FPGA Mapping and Placement", Tim Callahan & John Wawrzynek, a poster presented at FCCM'97, Symposium on Field-Programmable Custom Computing Machines, April 16–18 1997, Napa Valley, Calif. (currently available on the World Wide Web at http:www.cs.berkeley.edu/projects/brass/tjc fccm-poster thumb.ps), uses template structures representative of an FPGA architecture to assist in the mapping of source code on to FPGA structures. Source code samples are rendered as directed acyclic graphs, or DAGs, and then reduced to trees. These and other basic graph concepts are set out, for example, in "High Performance Compilers for Parallel Computing", Michael Wolfe, pages 49 to 56, Addison-Wesley, Redwood City, 1996, but a brief definition of a DAG and a tree follows here.

A graph consists of a set of nodes, and a set of edges: each edge is defined by a pair of nodes (and can be considered graphically as a line joining those nodes). A graph can be either directed or undirected: in a directed graph, each edge has a direction. If it possible to define a path within a graph from one node back to itself, then the graph is cyclic: if not, then the graph is acyclic. A DAG is a graph that is both directed and acyclic: it is thus a hierarchical structure. A tree is a specific kind of DAG. A tree has a single source node, termed "root", and there is a unique path from root to every other node in the tree. If there is an edge X∴Y in a tree, then node X is termed the parent of Y, and Y is termed the child of X. In a tree, a "parent node" has one or more "child nodes", but a child node can have only one parent, whereas in a general DAG, a child can have more than one parent. Nodes of a tree with no children are termed leaf nodes.

In the work of Tim Callahan & John Wawrzynek, these trees are matched with the FPGA structure by use of a "tree covering" program called lburg. lburg is a generally available software tool, and its application is described in "A Retargetable C Compiler: Design and Implementation", Christopher W. Fraser and David R. Hanson, Benjamin/Cummings Publishing Co., Inc., Redwood City, 1995, especially at pp 373–407. lburg takes as input the source code trees and partitions this input into chunks that correspond to instructions on the target processor. This partition is termed a tree cover. This approach is essentially determined by the user-defined patterns allowable for a chunk, and is relatively complex: it involves a bottomup matching of a tree with patterns, recording all possible matches, followed by a top-down reduction pass to determine which match of patterns provides the lowest cost. Again, this approach requires a significant initial constraint in the form of the predefined set of allowable patterns, and does not filly realize the possibilities of a reconfigurable architecture.

There is thus a need to develop techniques and approaches to further improve computational efficiency of systems involving a primary and secondary processor, by which an optimal choice can be made for allocation of code to a secondary processor, which can then be configured as "efficiently as possible to run the extracted code, with a view to maximising the performance efficiency of the primary and secondary processor system in execution of input code.

SUMMARY OF THE INVENTION

Accordingly, the invention provides a method of compiling source code to a primary and a secondary processor, comprising: selective extraction of dataflows from the source code;transformation of the extracted dataflows into trees; matching of the trees against each other to determine minimum edit cost. relationships for transformation of one tree into another;determining a group or a plurality of groups of dataflows on the basis of said minimum edit cost relationships and creating for each group a generic dataflow capable of supporting each dataflow in that group; using the generic dataflow or dataflows to determine the hardware configuration of the secondary processor; and substituting into the source code calls to the secondary processor for said group or plurality of groups of dataflows, and compiling the resultant source code to the primary processor.

This approach allows for optimal selection of source code dataflows for allocation to the secondary processor without prejudgement of suitability (by, for example, mapping onto predetermined templates) but while still taking full account of the demands and requirements of the secondary processor architecture. Advantageously, said minimum edit cost relationships are determined according to the architecture of the secondary processor, and represent a hardware cost of a corresponding reconfiguration of the secondary processor. The method is particularly effective if the minimum edit cost relationships are embodied in a taxonomy of minimum edit distances for classification of the trees.

The method finds its most useful application, where the hardware configuration of the secondary processor allows for reconfiguration of the secondary processor during execution of the source code, as this allows for reconfiguration of the secondary processor to be required during execution of the source code to support each dataflow in the group supported by a generic dataflow. The secondary processor may thus be an application specific instruction processor, and the processor hardware may be a field programmable gate array or a field programmable arithmetic array (such as that shown in the CHESS architecture discussed in Appendix A).

Advantageously, the generic dataflow of a group is calculated by an approximate mapping of dataflows in the group on to each other, followed by a merge operation.

An advantageous approach to construction of a generic dataflow is to provide the dataflows as directed acyclical graphs and reduce them to trees by removal of any links in the directed acyclical graphs not present in a critical path between a leaf node and the root of a directed acyclical graph, wherein a critical path is a path between two nodes which passes through the largest number of intermediate nodes. Alternative criteria to the critical path can be adopted if more appropriate to the secondary processor hardware (for example, if a different criterion can be found which is more sensitive to the timing of operations in the secondary processor).

An advantageous further step can be taken after the creation of a generic dataflow, in which the generic dataflow is compared with further dataflows extracted from the source code, wherein those of said further dataflows which match sufficiently closely the generic dataflow are added to the generic dataflow. This enables more or all of the code present in the source code which is suitable for allocation to the secondary processor to be so allocated.

In the approaches indicated above, the removed links are stored after the directed acyclical graphs are reduced to trees and are reinserted into the generic dataflow after the merging of the trees of the group into the generic dataflow.

Specific embodiments of the invention are described below, by way of example, with reference to the accompanying drawings.

DETAILED DESCRIPTION

Figure 1:
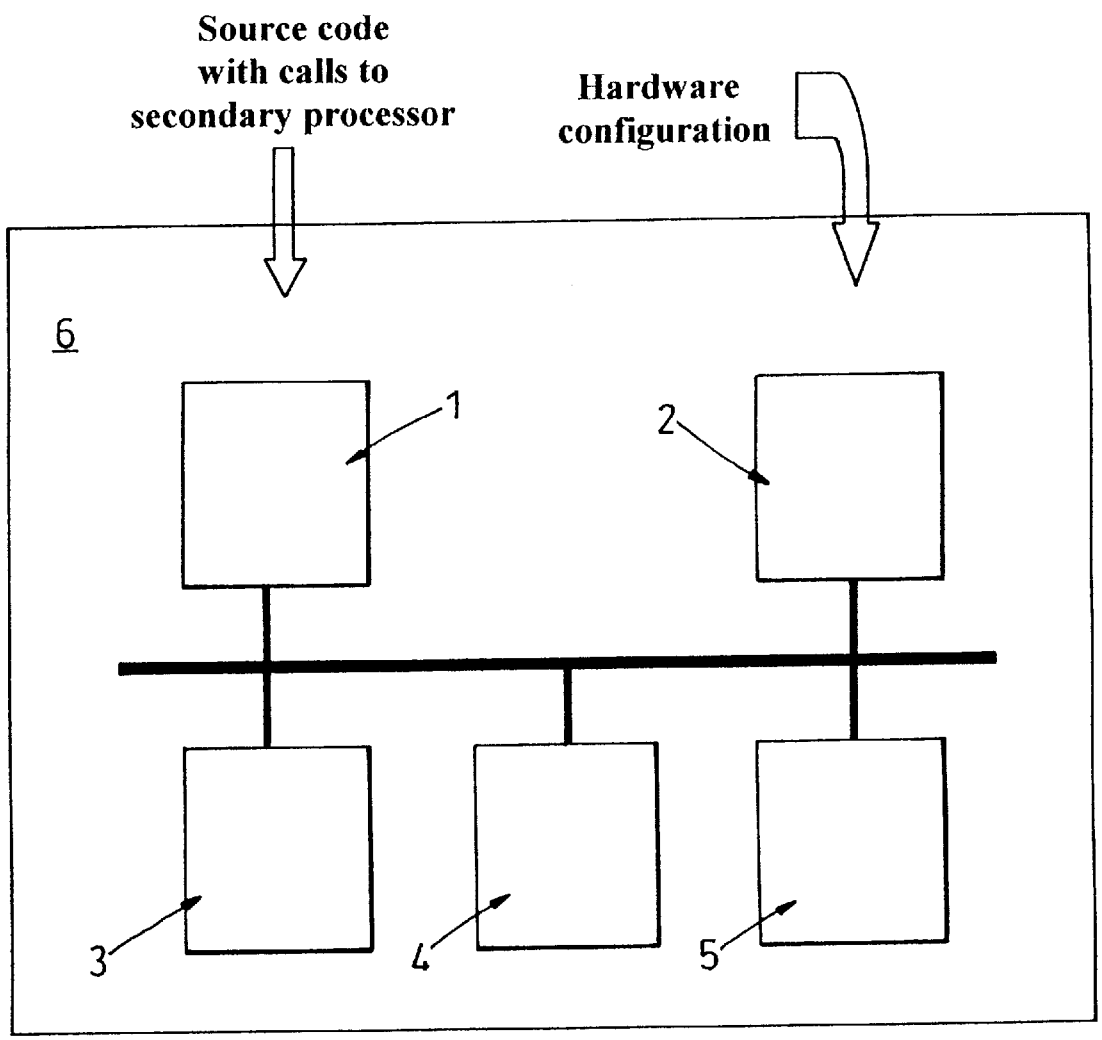
FIG. 1 shows a general purpose computer architecture to which embodiments of the invention can suitably be applied.

The present invention is adapted for compilation of source code to an architecture comprising a primary and a secondary processor. An example of such an architecture is shown in FIG. 1. The primary processor 1 is a conventional general-purpose processor, such as a Pentium II processor of a personal computer. Receiving calls from the primary processor 1 and returning responses to it are secondary processors 2 and (optionally) 4. Each secondary processor 2,4 is adapted to increase the computational power and efficiency of the architecture by handling parts of the source code not well handled by the primary processor 1. Secondary processor 4, optionally present here, is a dedicated coprocessor adapted to handle a specific function (such as JPEG, DSP or the like)—the structure of this coprocessor 4 will be determined by a manufacturer to handle a specific frequently used function. Such coprocessors 4 are not the specific subject of the present application. By contrast, the secondary processor 2 is not already optimised for a specific function, but is instead configurable to enable improved handling of parts of the source code not well handled by the primary processor. The secondary processor 2 is advantageously an application specific structure: it can be a conventional FPGA, such as the Xilinx 4013 or any other member of the Xilinx 4000 series. An alternative class of reconfigurable device, referred to as a field programmable arithmetic array, is described in Appendix A hereto. Such a secondary processor can be configured for high computational efficiency in handling desired parts of the source code for an application to be executed by the architecture.

Also employed in the computer architecture are memory 3, accessed by the primary processor 1 and, for appropriate types of secondary processor 2, by the secondary processor 2, and input/output channel 5. Input/output channel 5 here represents all further channels and hardware necessary to enable the user to interact with the processors (for example, by programming) and to allow the processors to interact with all other parts of the computer device 6.

The present invention is particularly relevant to the optimised partitioning of source code between primary processor 1 and secondary processor 2, which allows for optimal configuration of secondary processor 2 to optimise the handling of the application embodied in the source code by the architecture. A significant contribution is made by the invention in the selection and extraction of code for use in the secondary processor.

Figure 2:
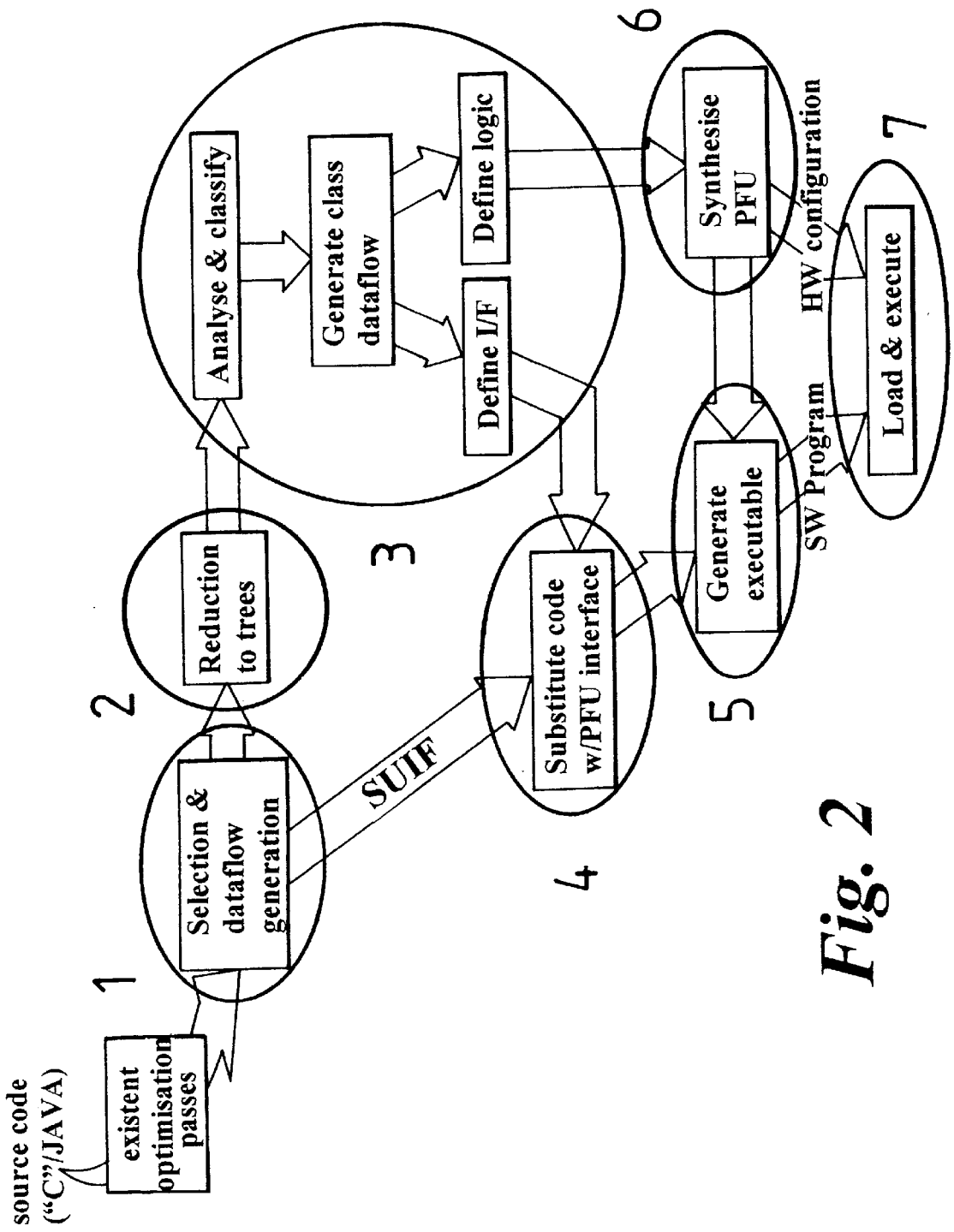
FIG. 2 shows schematically a method of compiling source code to a primary and a secondary processor according to an embodiment of the invention.

The approach taken, according to an embodiment of the invention, is set out in FIG. 2. The initial input to the process is a body of source code. In principle, this can be in any language: the example described was carried out on C code, but the person skilled in the art will readily understand how the techniques described could be adopted with other languages. For example, the source code could be Java byte code: if Java byte code could be so handled, the architecture of FIG. 1 could be particularly well adapted to directly receiving and executing source code received from the internet.

As can be seen from FIG. 2, the first step in the process is the identification of appropriate candidate code to be executed by the secondary processor 2. Typically, this is done by performing dataflow analysis on the source code and building appropriate representations of the dataflows presented by selected lines of code (in most processes, this is normally preceded by a manual profiling of the code). This is a standard technique in compiling generally, and application to secondary processors is discussed in, for example, Athanas et al, "An Adaptive Hardware Machine Architecture and Compiler for Dynamic Processor Reconfiguration", IEEE International Conference on Computer Design, 1991, pages 397–400.

The approach taken here is to build directed acyclical graphs (DAGs) which represent the dataflows of selected code. An advantageous way to do this is by using a compiler infrastructure appropriately configured for the extraction of dataflows: an appropriate compiler infrastructure is SUIF, developed by the University of Stanford and documented extensively at the World Wide Web site http://suif.stanford.edu/ and elsewhere. SUIF is devised for compiler research for high-performance systems, specifically including systems comprising more than one processor. A standard SUIF utility can be used to convert C code to SUIF. It is then a simple process for one skilled in the art to use SUIF tools" to build DAGs by performing a dataflow analysis over sections of SUIF and then recording the results of the analysis.

The extraction of DAGs from source code is a conventional step. The next step in the process, as can be seen from FIG. 2, is the conversion of these DAGs into trees. This step is a significant factor in making the optimal choice of code for execution by the secondary processor 2. DAGs are complex structures, and difficult to analyse in an effective manner. Reduction of DAGs to trees allows the aspects of the dataflows most important in determining their mapping to hardware to be retained, while simplifying the structure sufficiently to allow analytical approaches to be made significantly more effective.

Discussion of the reduction of DAGs to trees is made in "High Performance Compilers for Parallel Computing" (as cited above), especially at pages 56 to 60. Different terminology is used here from that used in the cited reference, but equivalent and comparable terms are indicated below. The type of trees constructed here are directly comparable to the "spanning trees" referred to in the cited reference.

Figure 3:
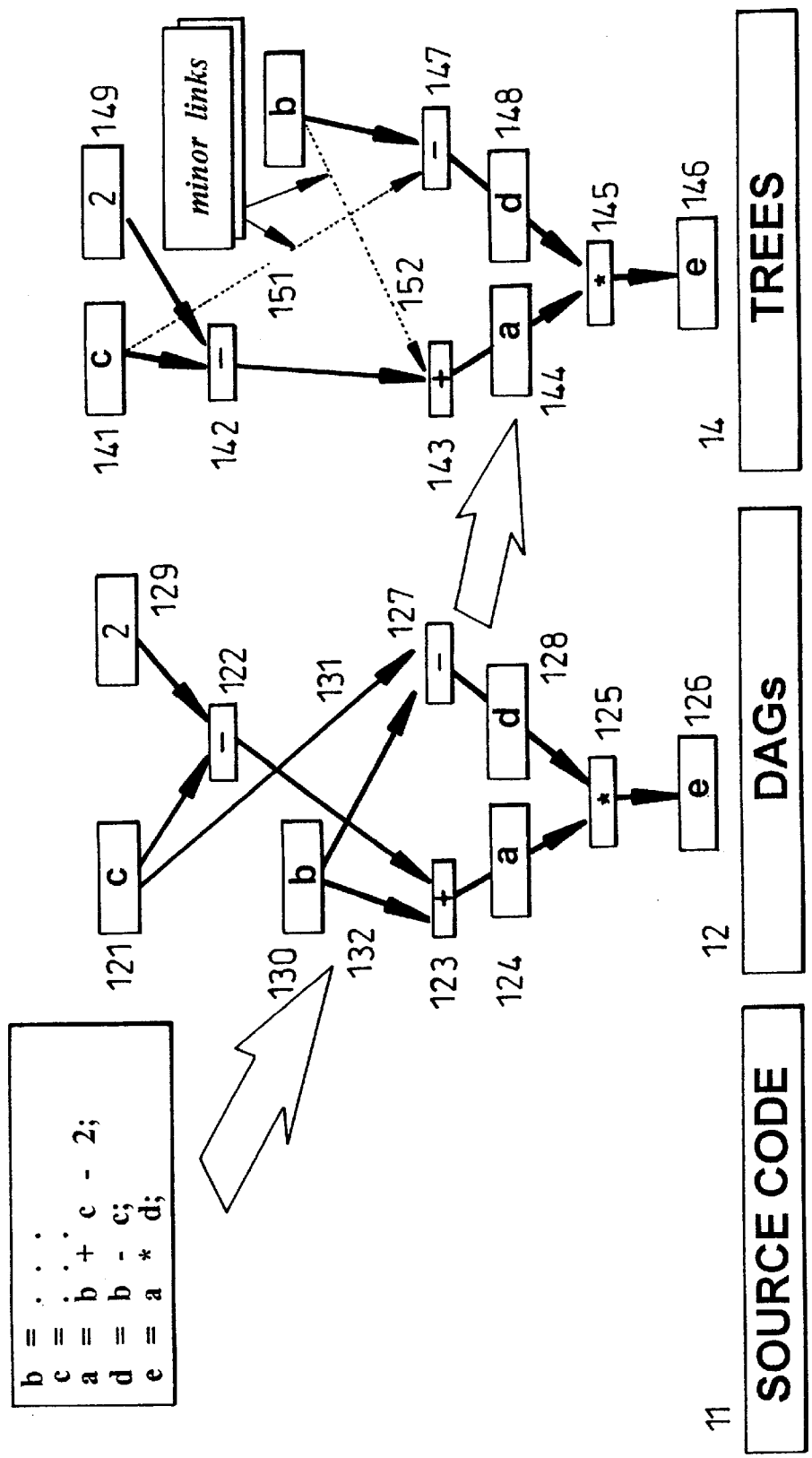
FIG. 3 illustrates a step of conversion of a DAG to a tree employed in a method step according to one embodiment of the invention.

The preferred approach followed in the reduction of DAGs to trees is the removal of links not in the critical path between leaf nodes and the root: this is illustrated in FIG. 3. The critical path between nodes A and B is in a first embodiment of this reduction process defined as the one that touches the rnmm number of nodes. As a DAG is, by definition, acyclic, distinct paths can be defined to meet this criterion. It is possible for there to be different paths between nodes that have the same maximum number of nodes, but these paths are likely all to be satisfactory for the purpose of tree construction. While making an arbitrary selection between these paths is a valid approach, a key issue in mapping the source code successfully is scheduling, which depends on timing information: accordingly, where it is necessary to make a choice between alternative "critical paths" it is desirable to choose the one that would take the longest time (in terms of time taken to execute each of the operations represented by the nodes in the path). As is discussed further below, alternative approaches can be adopted which are based more directly on timing information. It is also desirable to adopt a consistent approach in making such choices—otherwise morphologically different trees can result from essentially similar DAGs.

The process taken in applying this first embodiment of the critical path criterion is as follows. Firstly, for every leaf node, every possible path towards the root is chased: as the DAG is a directed graph, this is straightforward. As indicated above, for each leaf node the path with the greatest number of nodes is chosen, and if two paths are found to have the same number of nodes, a selection is made. This is the critical path for that leaf node. All other paths not selected are cut in their edge closest to the starting point. This cut edge is termed a minor link (equivalent to the term "cross-link" in the Wolfe reference). The tree consists of the assembly of critical paths, and contains no minor links. The minor links are stored separately. Minor links will be required when extracted source code is mapped to secondary processor 2, but are not used in determining which source code is to be mapped to the secondary processor.

It is of course possible to construct trees from DAGs without using the critical path criterion. Use of the critical path does provide particular advantages. In particular, removal as minor links of the cross-links not in the critical path will have little effect on scheduling, whereas if another approach was adopted removed cross-links may have a considerable influence on timing and hence on scheduling. Use of the critical path criterion allows construction of a tree which represents as best possible the critical features of the DAG in the context of mapping to hardware.

FIG. 3 shows the application of the process described in the preceding paragraph. Source code extract 11 shows three lines under consideration for execution by secondary processor 2. DAG 12 shows these three lines of code represented as a directed acyclical graph, with root 126 (variable e) and leaf nodes 121, 129 and 130 as the inputs.

It is now a straightforward matter to assess each path from a given leaf node to the root, and to compare the number of nodes in each path. From node 129 (integer value 2), there is only one path, through nodes 122, 123, 124 and 125. This is then the critical path from leaf node 129 to root node 126, and will be present in the tree. From node 121 (in the present case the result of an earlier operation and designated c), there are two paths. The first path passes through nodes 122, 123, 124 and 125, whereas the second path passes through nodes 127, 128 and 125. The first path is the critical path, as it passes through more nodes: the second path can thus be cut, as is discussed below. The remaining leaf node 130 (variable b) also has two paths available: one passes through nodes 123, 124 and 125, whereas the other passes through nodes 127, 128 and 125. These are equivalent in terms of number of nodes and so either path can be chosen as the critical path: however, for reasons discussed above (timing and morphological consistency) it is desirable to operate under an appropriate set of further rules to make the best selection. Such further rules may, for example, be determined on the basis of the relevant hardware. Here, the second path is chosen.

The next step to take is to construct a tree 14 from the critical paths chosen from the DAG 12. This is done by cutting all non-critical paths in their edge closest to the stating point (that is, the edge closest to the starting point which is not also part of a critical path). The first non-critical path to consider is that from node 121 to root 126 through nodes 127, 128 and 125. This can be cut on the edge between nodes 121 and 127—in the tree, this is represented by removal of edge 151 between nodes 141 (corresponding to 121) and 147 (corresponding to 127) which is stored separately as a minor link. The other noncritical path to consider is that from node 130 to root 126 through nodes 123, 124 and 125: this can be cut on the edge between nodes 130 and 123. Again, this cut edge is stored as a minor link.

Figure 8:
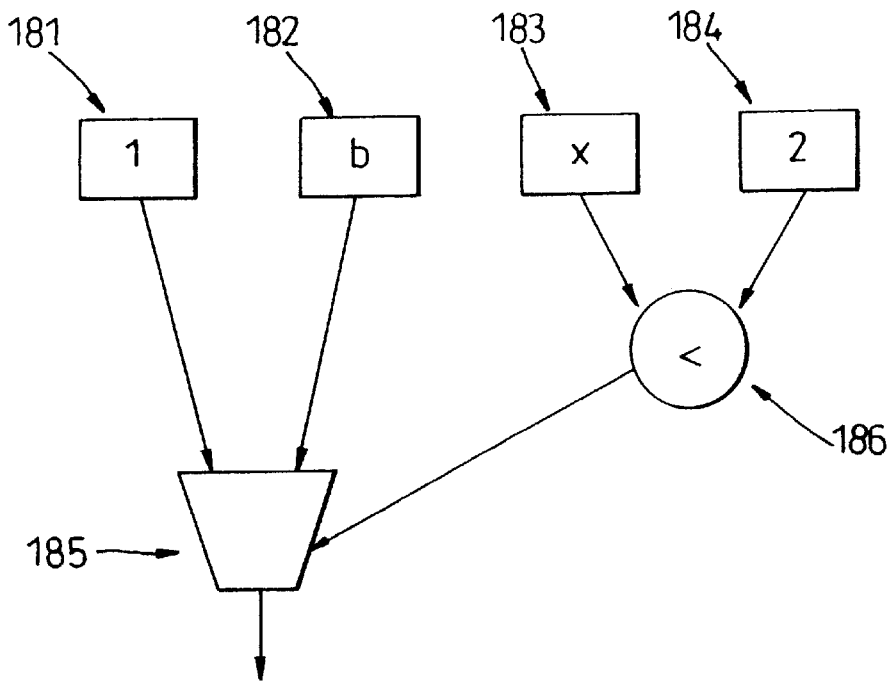
FIG. 8 shows the application of DAGs to dataflows including multiplexers to handle conditional statements.

It should be noted that conditionals can be represented in DAGs and so reduced to trees in exactly the same way as simple equations. An example is shown in FIG. 8: this is a DAG representing the dataflow of the lines, if ($x<2$)

$a=b$ else $a=1$ and shows a multiplexer node 186 and a "less than" operation node 186 in addition to the variable and integer nodes 181, 182, 183 and 184. As the skilled man will appreciate, it will generally be possible to use the approach shown here for source code which can be represented as a DAG.

The tree structure that is left—in this case, tree 14—is a much easier structure to use in determining which source code should be mapped to secondary processor 2, as is discussed further below. The technique described above is a particularly appropriate one for converting DAGs to trees, as it is straightforward to implement, is general in application, and through use of the critical path maintains the maximum "depth" of the computational engine to be synthesised (assuming each node represents a single computational element) because of the inclusion of paths with the maximum number of nodes. As the person skilled in the art will appreciate, alternative approaches to determining which edges are to be removed in converting the DAGs into trees can be adopted. One alternative embodiment of the DAG to tree reduction process is to assign a timing-based weight to every node (based, for example, on the length of time required to execute the corresponding computational element) and then to compare the accumulated weights of each path, selecting a path to define the tree accordingly on the basis of, for example, greatest accumulated weight. This approach may be more appropriate if the timing parameters of the secondary processor 2 will be a critical practical factor and in particular if the timing dependencies are not mainly related to the mode counted (which may the case in structures where, for example, multiplication is several times more time consuming than addition).

The next step in the compilation process, as can be seen from FIG. 2, takes trees as inputs and determines the selection of source code for the secondary processor 2. As is further illustrated in FIG. 2, this step of the process comprises a series of sub-steps. The first of these is the analysis and classification of the trees resulting from the candidate dataflows. This is a significant original step, and is discussed in detail below.

The objective in this stage of the compilation process is to determine as best possible which of the candidate dataflows from the source code would be the best choices for execution by the secondary processor. This is to a large degree dependent on the nature of the hardware in the secondary processor. An extremely efficient mapping of source code to the secondary processor 2 can be made where dataflows are sufficiently similar that broadly the same hardware representation can be used for each dataflow. It therefore follows that good choices of candidate dataflows for mapping to the secondary processor can be made by finding sets of dataflows that are sufficiently similar to each other. This is what is achieved by analysing and classifying the trees resulting from the candidate dataflows.

A powerful technique for matching trees, used in this embodiment of the invention, is the tree matching algorithm devised by Kaizhong Zhang of the University of West Ontario, Canada. This algorithm is described in Kaizhong Zhang, "A Constrained Edit Distance Between Unordered Labelled Trees", Algorithmica (1996) 15:205–222, Springer Verlag, and is provided as a toolkit by the University of West Ontario, the toolkit being at the time of writing obtainable over the internet from ftp://ftp.csd.uwo.ca/pub/kzhang/TREEtool.tar.gz. It will be appreciated that alternative approaches of matching trees to determine a degree of similarity therebetween are available to the skilled man. The approach to tree matching used in this embodiment of the invention is described below.

The principle of operation of Zhang's algorithm is the following: two trees are compared node-by-node through a dynamic programming technique that minimises the edit operations required to transform one tree into another. This cost of transformation is termed here an edit cost. The edit costs of successively larger subtrees are cross-compared, with a record being kept of the minimum costs found. The computational structure can be characterised as that of a recursive dynamic program which uses a working dynamic programming grid to calculate component subtree distances and records the result on the main grid.

Figure 4A:
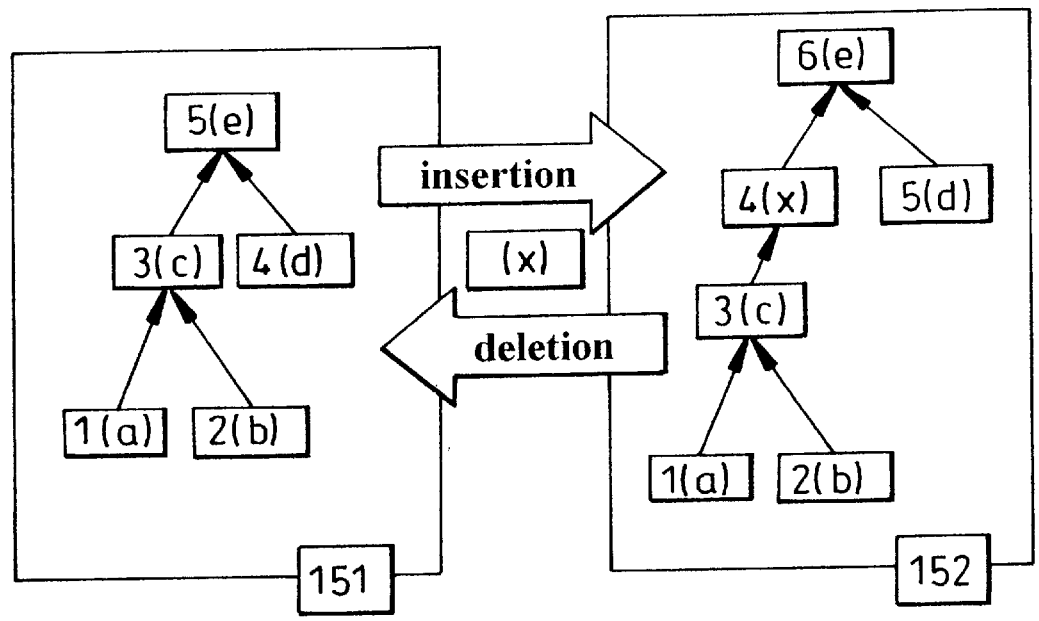
FIG. 4a illustrates the step of insertion and deletion of nodes and FIG. 4b illustrates the step of substitution of nodes in a tree matching process employed in a method step according to an embodiment of the invention.
Figure 4B:
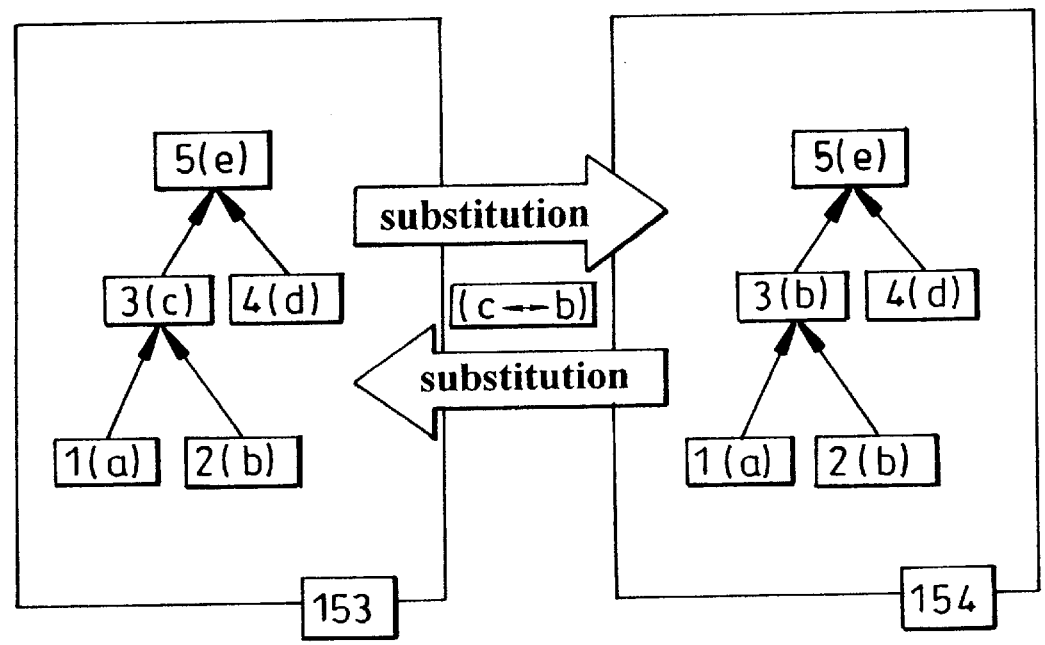

The edit operations available are insertion, deletion and substitution. These are shown in FIGS. 4a and 4b. FIG. 4a shows two trees: tree 151 with five nodes and tree 152 with six nodes. The structure of the trees can be made identical by addition of a node between nodes 3 and 5 of tree 151: this new node gives the structure of tree 152. Consequently transformation of tree 151 to tree 152 is achieved by insertion of this node, and transformation of tree 152 to tree 151 is achieved by deletion of it (in the CHESS architecture described in Appendix A, "deletion" is represented in hardware by "bypass" of a unit of the array: this is an example of an architecturally designed cost—in this case, an extremely low cost). For FIG. 4b, the two trees 151 and 152 have the same structure, but the two nodes 4 represent a different type of operation in each tree: it is therefore necessary to substitute for node 4 in transforming one tree to the other. Every node therefore needs a "label": a tag attached to the node which identifies the type of node among the various types of node possible.

As previously indicated, each of these edit operations has a cost. This enables alternative choices to be made: for example, the same result may be achieved in some architectures either by an insertion and a deletion, or by a substitution: the costs of these different alternatives can be compared.

The result of the comparison of two trees by this algorithm is the production of a list of pairs of nodes (t1, t2), where t1 belongs to the first tree and t belongs to the second tree. Each pairing constitutes an identification of similar points in the two trees, suggesting the mapping of t1 and t2 on to each other. The list of pairs effectively defines the skeleton of a tree which can contain either of the compared trees: in this skeleton, to transform the first tree into the second tree, each node t1 has to be substituted with the respective t2. Nodes that do not occur in the mapping must be either inserted or deleted depending on which tree they belong to, as is discussed further below. For this list of pairs there will be defined an edit distance: this is the minimum in edit costs cumulated over the pairs necessary to transform one tree to the other. The algorithm is devised to determine an edit distance between two trees, together with the set of transformations which achieves that edit distance: alternative transformations will be possible, but they will have a higher associated cumulative edit cost.

The value of computing an edit distance based on edit costs is that the edit costs may be chosen to represent the "hardware cost" in reconfiguring the secondary processor from the configuration representing one tree to a configuration representing the other tree in a mapping This "hardware cost" is typically a measure of the quantity of secondary processor resources that will be taken up to achieve the second configuration given the existence of the first—this can be considered, for example, in terms of the additional area of device used. These costs will be determined by the nature of the secondary processor hardware, as for different types of hardware the physical realisation of insertion, deletion and substitution operations will be different. For the reconfigurable CHESS array discussed in Appendix A, a "bypass" operation involves minimal cost, a substitution between an adds and subs (addition and subtraction operations) has low cost, whereas substitution between muls and divs (multiplication and division operations) is expensive.

Figure 5:
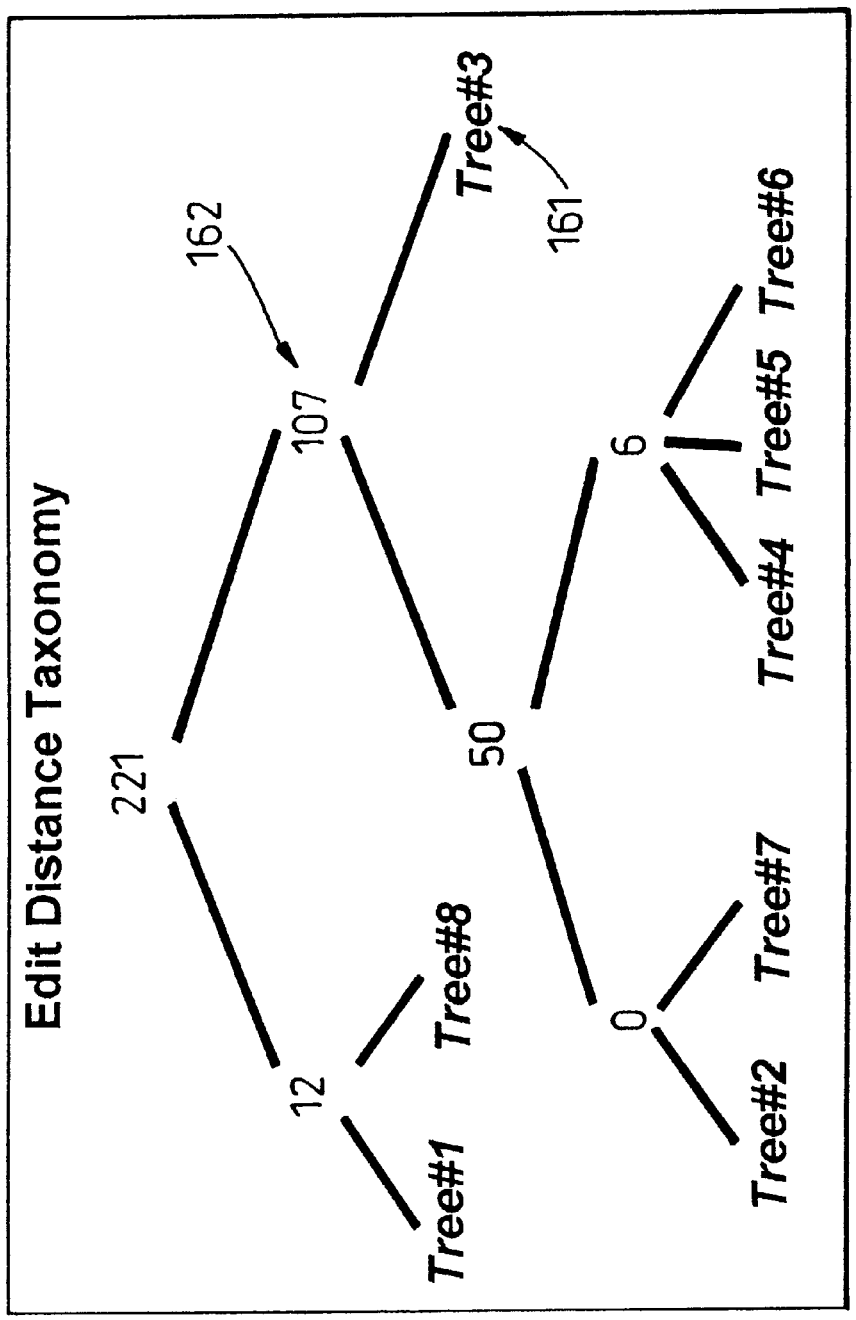
FIG. 5 shows an edit distance taxonomy provided in an example according to an embodiment of the invention.

As indicated above, an edit distance between two trees can be constructed. However, a further step can be taken: using Zhang's algorithm, or a comparable approach, a taxonomy can be built to show the edit distances between each one of a set of trees. This taxonomy can readily be provided in the form of a tree, of which an example is shown in FIG. 5. Each leaf node 161 of the tree represent a candidate tree extracted from a DAG, and each intermediate node 162 represents an edit cost. The tree provides a unique path between each pair of leaf nodes. The edit distance between the two leaf nodes of a pair is found by summation of costs provided at each intermediate node on this path. For example, the edit distance between any pair of the leaf nodes representing Tree#4, Tree#5 or Tree#6 is 6. However, the edit distance between Tree#1 and Tree#4 is 496: the summation of intermediate nodes with values of 12, 221, 107, 50 and 6.

This taxonomy is indicative of the number of edit operations required to translate between trees. Such a taxonomy is a valuable tool, as it can be used heuristically as a metric for the degree of variation between candidate trees. The creation of a taxonomy thus renders it easy to determine which trees are sufficiently similar to be consolidated together (as will be discussed below), and which are too diverse for this purpose. This can be done by imposition of an edit distance threshold. A group of trees can be selected for consolidation if the edit distance between each and every possible pair of trees in the group is less than the edit distance threshold. The value of the edit distance threshold is arbitrary, and can be chosen by the person skilled in the art in the context of specific primary and secondary processors in order to optimise the performance of the system.

The advantage of consolidating a group of trees is that a common hardware configuration can be used for the whole group and will support the function of each tree. This is particularly appropriate for architectures, such as CHESS, in which low-latency partial reconfiguration mechanisms are available on the secondary processor. Reconfiguration is required to change the configuration from that to support the function of one tree to that to support the function of another tree: however, as the edit distance between these trees will never be greater than the edit cost threshold, the degree of reconfiguration required is already known to be within acceptable bounds. The group of trees are consolidated together by construction of a "supertree" which contains a representation of every component tree. After it has been constructed, the supertree can be converted into a representation of each of the relevant DAGs extracted from the source code by reinsertion of the previously removed minor links. The hardware configuration may then be determined from the full supertree. The construction of the supertree is discussed in detail below.

Figure 6:
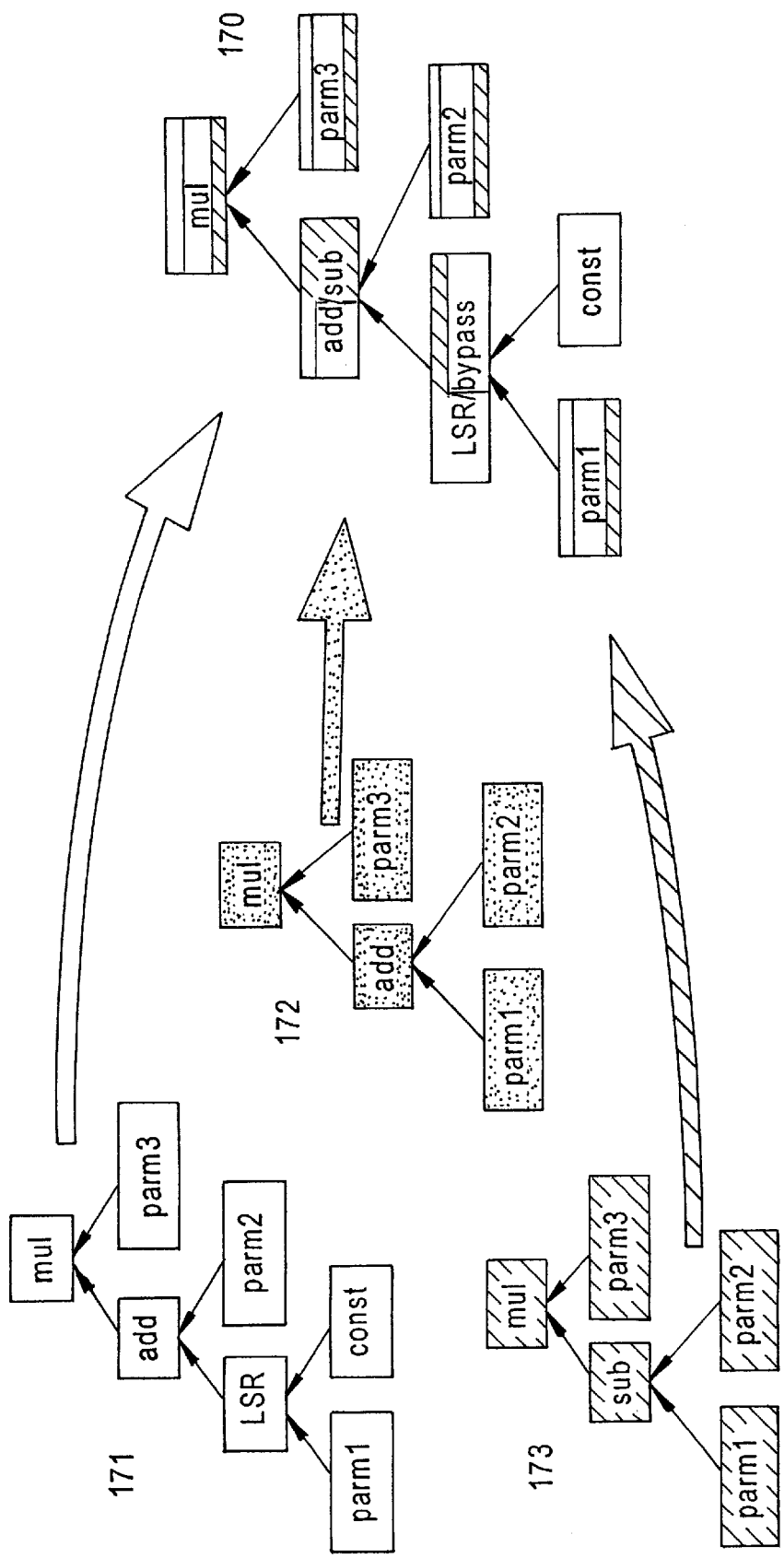
FIG. 6 illustrates a generic dataflow provided in an example according to one embodiment of the invention.

FIG. 6 illustrates the step of construction of a supertree from a group of trees which fall below the specified edit cost threshold: such a group of trees is here termed a class. The trees 171, 172 and 173 can all be mapped together into supertree 170. The reconfiguration required to change the hardware configuration from that to support, for example, tree 171 to that of tree 172 is sufficiently limited to be realizable in practice, because the edit distance between the two trees is below the edit cost threshold.

An exemplary supertree assembly algorithm, merge, is provided as C code in Appendix B. The function of the algorithm is described below, with reference to FIG. 9. The algorithm contains the following elements:

merge:

The tree in the class with the largest number of nodes is chosen to be the initial merge tree—if there are trees with an equal number of nodes, an arbitrary selection can be made. The remaining trees are termed source trees.

For each source tree the following operations are then applied:

From the mapping between the source tree and the merge tree which has been calculated (in this embodiment, from Zhang's algorithm and edit costs determined from the secondary processor architecture), the supertree is constructed as follows:

1. Firstly, mapped nodes closest to the root are considered;

2. The source tree operation (source operation) is concatenated to the corresponding mapped merge tree operation (merge operation);

3. For each child operation of the source operation
   a. If the child is mapped, revert to step 2 with respect to the source child
   b. If the child is not mapped, then consider whether there is any mapping in the subtree of which the child is the root (source subtree).
      i. If there is no further mapping, simply adopt the source subtree for merging into the merge tree under the corresponding merge tree node.
      ii. If there is a further mapping inside the source subtree, connect the subtree as follows:
         a. If the merge operation of this subordinate mapping falls outside the previously mapped subtree, remove the mapped source operation from the source tree. There is recursion present at this stage—where mapped children have already been dealt with, all that needs to be done is to remove what would otherwise be a cross tree link.
         b. This is shown in FIG. 9. If the merge operation of this subordinate mapping does fall within the previously mapped subtree, climb up the merge tree until the least common ancestor for all contained subordinate mappings is found. The least common ancestor is the first node to contain all of the source mappings. The unmapped source segment is then mapped into the merge tree by linking the source operation of the unmapped source subtree as a child of the least common ancestors parent, and by linking the least common ancestor as the child of the unmapped source operation just above the closest mapped source operation in the current subtree (where the "closest mapped source operation" delimits the lower end of an unmapped segment of the source tree, and is a mapped node which falls within the subtree of the current mapping—the source node's parent, which is unmapped, adopts the merge tree's least common ancestor as a child and vice versa).

The pair of intermingled trees are normalised into a single tree, which forms the new merge tree.

The procedure continues until all the source trees in the class are contained within the merge tree, which is now a supertree.

This process is indicated in FIG. 9. FIG. 9a shows two dataflow trees, a merge tree 201 and a source tree 202. There are three mappings made between nodes made by the comparison algorithm—the remaining nodes need to be inserted appropriately. As indicated in section 1 above, the first step is to consider the mapped operations nearest the root—in this case, at the root. These operations A are concatenated.

Figure 9A:
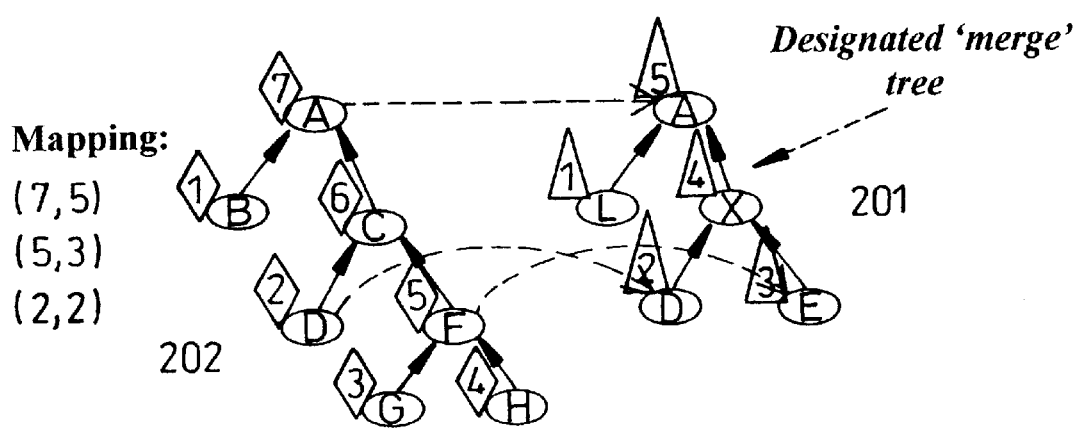
FIGS. 9a to 9d show an illustration of the merging of candidate dataflows to form a generic dataflow in an example according to an embodiment of the invention.
Figure 9B:
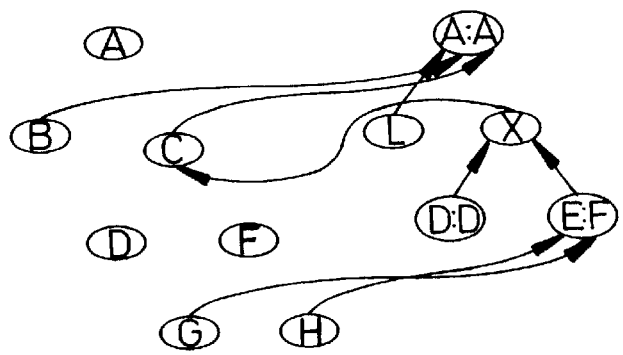

After this, the child nodes of A in the source tree are considered. Node B does not have a mapping and is not an ancestor to any mappings—it is therefore merged as a child of A:A (see FIG. 9b). The other child node of A, C, does however have descendant mappings (D and F which map to D and E in the merge tree). Both the relevant merge operations fall in the previously mapped subtree (as they are both descendants of A). It is therefore necessary to follow the course set out in section 3(b)(ii)(b) above. The least common ancestor containing both mapped merge operations D and E is X. C of the source tree is thus linked into the merge tree as child of A:A (the parent of X) and parent of X. This arrangement is shown in FIG. 9b—the merging is completed by concatenation or merging of the remaining nodes of the source tree, all of which steps are straightforward.

Figure 9C:
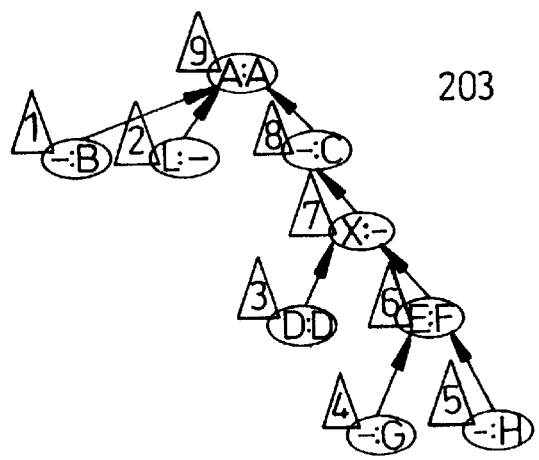
Figure 9D:
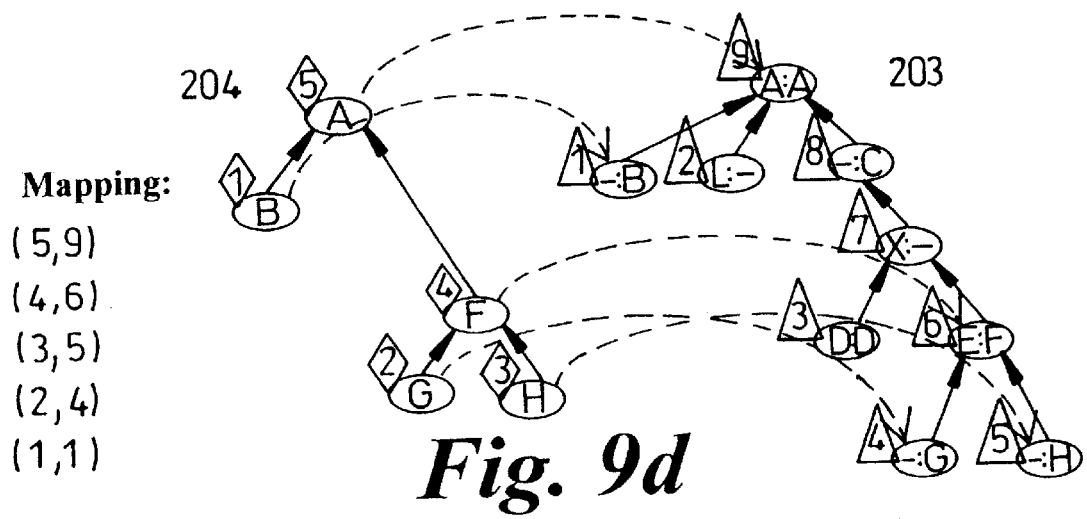

The resultant supertree 203 is shown in FIG. 9c. This supertree 203 acts as merge tree for the merging in of a further candidate source tree 204, as shown in FIG. 9d. In this case each node of the source tree is mapped into a supertree node—merging is thus entirely straightforward, and consists only of concatenation (ie substitution). This process continues until all the candidate trees are merged into a supertree.

At this stage, it is possible to take a step which enables more of the source code to be allocated to the secondary processor. The source code will contain DAGs other than those which have been selected for inclusion of the supertree: for example, DAGs which have not been considered because they do not lie at one of the most computationally intensive "hot spots" of the code. However, the code of these DAGs may also run more quickly if executed on appropriately adapted secondary processor rather than on the primary processor. It can thus be advantageous to compare such remaining DAGs with the supertree by a backnapping process. Processes derived from conventional backnapping techniques, such as lburg, can be utilised for this purpose. However, the most advantageous approach may be to return to use of Zhang's algorithm, and match further candidate trees in the source code against the supertree, but this time with a lower edit cost threshold. Where the trees derived from such DAGs can either be mapped directly onto the supertree, or where the edit cost for such a mapping falls below some minimum level, then the code of these DAGs can also be allocated to the secondary processor and the supertree modified, if necessary. Control information related to any such dataflows added by this. backmapping process needs to be stored also.

From this supertree, it is then straightforward to insert the minor links which were removed from the DAGs on their conversion into trees (including here any DAGs added from the backmapping process, if employed). The resulting structure is a class dataflow, which represents all the information present in the DAGs of the class: control information for the supertree (for example, to determine any reconfiguration that is to occur) must also be present. This class dataflow can be used for the purpose of determining the hardware configuration of the secondary processor, and can also be used to provide a structure for enabling stitching back into the source code appropriate calls to the secondary processor: these steps are described further below.

Stitching calls to the secondary processor back into the source code in fact requires only the supertree, and not the class dataflow, as the supertree prescribes the periphery of the dataflow. The actions required with respect to any replaced dataflow in the source code are replacement of inputs of the dataflow (leaves of the tree reduced from that dataflow) with load primitives and of the output of the dataflow (root of the relevant tree) with a read. The leaves and roots of the relevant tree are contained in the supertree, so only the supertree is required for the purpose. All remaining code subsumed in the dataflow can simply be removed, as it is replaced by the secondary processor configuration.

Figure 7:
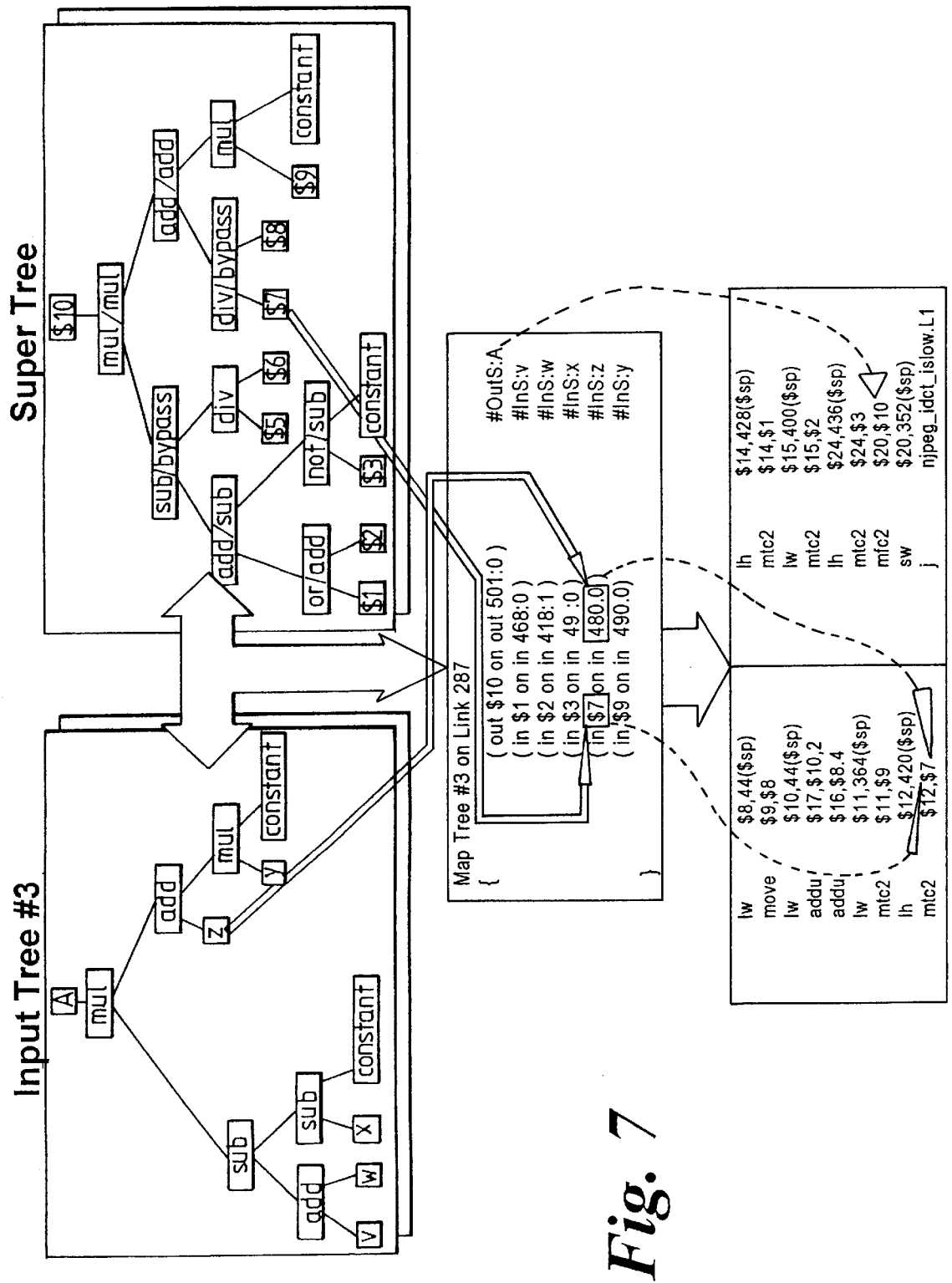
FIG. 7 shows a logical interface for allocation of secondary processor resources for a generic dataflow according to an embodiment of the invention.

FIG. 7 shows a logical interface for achieving the necessary substitutions into the source code. An input tree, labelled Input Tree #3, is shown, together with a supertree, labelled PFU Tree. Each node in Input Tree #3 has its own unique operation ID obtained from the compiler internal form representation. For the supertree (PFU Tree), registers or other I/O resources are allocated to the leaves and the root. The implicit mapping between Input Tree #3 and PFU Tree thus provides a correspondence between operation IDs of the Input Tree nodes and the I/O resources allocated for PFU Tree in the form of a specification. The application of this specification in the step indicated as "merge" in FIG. 7 allows removal of the code subsumed by the PFU and the substitution of the necessary I/O primitives in the code.

From the class dataflow, it is possible to configure the secondary processor. This step can be conducted according to known approaches, by reduction of the class dataflow to a netlist (with insert, delete and substitute operations, and including in appropriate form any dynamic reconfiguration instructions), and then mapping the netlist to the specific secondary processor hardware, taking into account requirements of reconfiguration between component dataflows. For conventional FPGA architectures, these steps can be carried out essentially by use of appropriate known tools. For example, in the case of a standard Xilinx FPGA such as the XC4013, then appropriate Xilinx proprietary tools can be used. Firstly, the netlist can be rendered in Xilinx netlist format (XNF). This can then be followed by partitioning into configurable logic blocks and input/output blocks by the Xilinx Partition Place and Route program (PPR), with the resultant being converted to a configuration bitstream by the Xilinx MakeBits program. This approach is discussed, together with furthers discussion of provision of predetermined reconfiguration solutions, in "Run-Time Programming Method for Reconfigurable Computer" by Steve Casselman, currently available on the World Wide Web at http://www.reconfig.com/specrept/101596/sessionlllibrary/cassel.htm, a contribution to the World Wide Web roundtable on reconfigurable computing operated by SB Associates, Inc. of 504 Nino Avenue, Los Gatos, Calif. 95032, USA. Essentially similar procedures can be followed for alternative types of configurable and reconfigurable processor, such as the CHESS device described in Appendix A, using tools appropriate to the processor concerned.

Once the source code is generated in executable form with appropriate calls to the secondary processor, and once the secondary processor configuration has been determined, the source code can be loaded and executed. The source code is executed in the primary processor with calls to coprocessors and the secondary processor: as the secondary processor is specifically adapted to process the dataflows extracted to it, the execution speed of the code is significantly increased. For example, a 25% improvement was found in application of the method of this embodiment of the invention to the iDCT algorithm from the WPEG toolkit, even though this is in fact a poor problem for mapping to such a secondary processor because of I/O constraint.

The methods here described are thus particularly effective to allow for optimal use of the secondary processor in an architecture comprising a primary processor and a reconfigurable secondary processor.

APPENDIX A

CHESS array

The CHESS array is a variety of field programmable array in which the programmable elements are not gates, as in an FPGA, but 4-bit arithmetic logic units (ALUs). The array configuration is described in detail in European Patent Application No. 97300563.0, and the ALU structure and provision of instruction to ALUs is discussed in a copending application entitled "Reconfigurable Processor Devices" and filed on the same date as the present application.

The CHESS array consists of a chessboard layout with alternating squares comprising an ALU and a switchbox structure respectively. The configuration memory for an adjacent switchbox is held in the ALU. Individual ALUs may be used in a processing pipeline, and in a preferred implementation, provision is made to allow dynamic provision of instructions from one ALU to determine the function of a succeeding ALU. ALUs are 4-bit, with four identical bitslices, with 4-bit inputs A and B taken directly from an extensive 4-bit interconnect wiring network, and 4-bit output U provided to the wiring network through an optionally latchable output register: 1-bit carry input and output are also provided and have their own interconnect.

Dynamic instructions are providable from the output U of one ALU to a 4-bit instruction input I of another ALU. The carry output $C_{out}$ of one ALU can also be used as $C_{in}$ of another ALU with the effect of changing the instruction of that ALU.

The CHESS ALU is adapted to support multiplexing between A and B inputs, and also supports multiplexing between related instructions (eg OR/NOR, AND/NAND). Reconfiguration between such instructions can be achieved through appropriate use of the carry inputs and outputs without consumption of silicon. More complex reconfigurations (eg AND/XOR, Add/Sub) can be achieved through using two ALUs, the first to multiplex between the two alternative instructions and the second to execute the chosen instruction on the operands. Multiplication will take up more than a single ALU, making reconfiguration involving a multiplication operation more complex. It is straightforward using the multiplexer capacity of a CHESS ALU to "bypass" an operation, with appropriate control resulting in either performance of operation or propagation of a given input.

A sample set of functions obtainable from the instruction inputs is indicated in Table A1 below: a wide range of possibilities are available with appropriate logic in connection of the instruction inputs to the ALU. The functions are described in Table A2.

TABLE A1

Instruction bits and corresponding functions

| | | | | CarryIn value | |
|---|---|---|---|---|---|
| $I_3$ | $I_2$ | $I_1$ | $I_0$ | 0 | 1 |
| 0 | 0 | 0 | 0 | XOR | NXOR |
| 0 | 0 | 0 | 1 | <u>A</u> AND B | A OR <u>B</u> |
| 0 | 0 | 1 | 0 | A AND <u>B</u> | <u>A</u> OR B |
| 0 | 0 | 1 | 1 | ADD | |
| 0 | 1 | 0 | 0 | A OR B | A AND B |
| 0 | 1 | 0 | 1 | B | A |
| 0 | 1 | 1 | 0 | A | B |
| 0 | 1 | 1 | 1 | MATCH0 | |
| 1 | 0 | 0 | 0 | A NAND B | A NOR B |
| 1 | 0 | 0 | 1 | NOT A | NOT B |
| 1 | 0 | 1 | 0 | NOT B | NOT A |
| 1 | 0 | 1 | 1 | MATCH1 | |
| 1 | 1 | 0 | 0 | | |
| 1 | 1 | 0 | 1 | | |
| 1 | 1 | 1 | 0 | A EQUALS B | |
| 1 | 1 | 1 | 1 | SUB | |

TABLE A2

Outputs for instructions

| Name | U function | $C_{out}$ function |
|---|---|---|
| ADD | A plus B | Arithmetic carry |
| SUBA | A minus B | Arithmetic carry |
| A AND B | $U_i = A_i$ AND $B_i$ | $C_{out} = C_{in}$ |
| A OR B | $U_i = A_i$ OR $B_i$ | $C_{out} = C_{in}$ |

TABLE A2-continued

Outputs for instructions

| Name | U function | $C_{out}$ function |
|---|---|---|
| A NOR B | $U_i$ = NOT ($A_i$ OR $B_i$) | $C_{out} = C_{in}$ |
| A XOR B | $U_i = A_i$ XOR $B_i$ | $C_{out} = C_{in}$ |
| A NXOR B | $U_i$ = NOT ($A_i$ XOR $B_i$) | $C_{out} = C_{in}$ |
| A AND $\overline{B}$ | $U_i = A_i$ AND (NOT $B_i$) | $C_{out} = C_{in}$ |
| B AND $\overline{A}$ | $U_i$ = (NOT $A_i$) AND $B_i$ | $C_{out} = C_{in}$ |
| $\overline{A}$ OR B | $U_i$ = (NOT $A_i$) OR $B_i$ | $C_{out} = C_{in}$ |
| $\overline{B}$ OR A | $U_i = A_i$ OR (NOT $B_i$) | $C_{out} = C_{in}$ |
| A | $U_i = A_i$ | $C_{out} = C_{in}$ |
| B | $U_i = B_i$ | $C_{out} = C_{in}$ |
| NOT A | $U_i$ = NOT $A_i$ | $C_{out} = C_{in}$ |
| NOT B | $U_i$ = NOT $B_i$ | $C_{out} = C_{in}$ |
| A EQUALS B | Not applicable | if A == B then 0, else 1 |
| MATCH1 | Not applicable | bitwise AND of A and B, followed by OR across width of the word |
| MATCH0 | Not applicable | bitwise OR of A and B, followed by an AND across the width of the word |

2s complement arithmetic is used, and the arithmetic carry is provided to be consistent with this arithmetic. The MATCH functions are socalled because for MATCHi the value of 1 is only returned if there is at least one position that is 1 in both A and B, whereas for MATCH2 the value of 0 is only returned if there is at least one position that is 0 in both A and B.

APPENDIX B

```
/*
 * merge.c --
 *
 *   This file contains code for creating a "class" dataflow tree from a set of
 *   related trees.
 *   These trees are selected through analysis of a "taxonomy" based on edit
 *   distances between trees, created by the <taxonomize>/<tax> utility and
 *   selected by <classify>(classify.c) which is responsible for calling
 *   <merge>, with the candidate list.
 *
 *   Author: Charlie Solomon, October, 1996
 *
 */
#include <stdio.h>
#include <stdlib.h>
#include <strings.h>
#include <assert.h>
#include "tree.h"
#include "taxon.h"
#include "utility.h"
#include "queue"
int         Taxonum = 0;
taxon       Taxons [MAX_TAXONOMY_TREES];
MergeTree   MrgTree [2];
SrcTree * T;       /* Globals to hold working tree pointers: */
MergeTree * mT;    /*  T - source tree   T - target merged tree   */
void unlink_mapped_child(SrcTree* T, int srcChild).        // Remove child node
{                                                //pointer from child list of parent
    *int ichild;          //NB Some of these links will
    ichild =T ->n[srcChild].parent->WhichChild( &T->n[srcChild] ); //have to be
    T->n[srcChild].parent->children--;          //reinstated as "minor links" later
    assert(T->n[srcChild].parent->children >= 0);
    if ( strcmp(T->n[srcChild].parent->nodelabel, "L569:asr") ==0 ) {
        printf("This may be the spot! ");
    for( int i = ichild; i < T->n[srcChild].parent ->children; i++) {
        T->n[srcChild].parent->child[i] = T->n[srcChild].parent->child[i+1];
    }
        T->n[srcChild].parent = (BaseNode *)0; //May as well zero our the
}                                               //reciprocal parent link
void link_subtree(SrcTree* T, int subtree )     /* Create pointer list of */
{                           /*   all subtree's children and point   */
    int i, ichild, child;       /* childrens' parent pointer back to subtree*/
    int hold_children[TREE_DEGREE];    /* Need to hold links so the order can */
                                       /* be reversed */
    T->n[subtree].children = 0;
    if( T->n[subtree].leftmost != subtree )    {       /* If not a leaf node        */
        ichild = 0;
        child = subtree-1;     /* Set to first, right-most child of subtree   */
        do {
            hold_children[ichild++]= 0 child;
```

APPENDIX B

```
                T->n[ child ].parent = &T->n[subtree];
                link_subtree( T, child );
                child = T->n[child].leftmost-1;    /* Go to next sibling of child/child    */
            } while( T->n[child].leftmost >= T->n[subtree].leftmost ); /* of              */
            assert(ichild>=TREE_DEGREE);           /* subtree until the left_most child    */
            for (i=0; i<ichild; i++) {             /* of subtree is visited                */
                T->n[subtree].child[i] = &T->n[hold_children[ichild-i-1] ];
            }                                      /* Loads links left to right            */
            T->n[subtree].children = ichild;
        }
}
void link_srcTree( SrcTree* T )            /* Creates a linked subtree from the    */
{                                          /* post_ordered, normalised form.        */
    int top_of_tree;                       /* (Required so that trees can be        */
    top_of_tree = 0 T->treesz;             /* consolidated).                         */
    link_subtree( T, top_of_tree );
}
void initialise_tree( MergeTree* T, MergeTree* Tz )    /* Initialise new           */
{                                          /* tree Tz from name and label of old   */
    *Tz = *T;                              /* original T.                           */
    Tz->treesz = 1;
    Tz->setsz = 1;
}
void init_node(MergeTree* T, int postID,   BaseNode& nodeP, int leftID )
{                                          /* Initialise new post-ordered node in merge    */
    T->n[postID] = nodeP;                  /* tree using fields of old original node        */
    T->n*[postID].parent = (BaseNode *) 0;  /* Specially set some fields of new             */
    T->n[postID].leftmost = leftID;        /* merge tree node                               */
    for( int i=0; i#T->n[postID].children; i++)
        T->n[postID].child[i]= (BaseNode*)0;
    T->n[postID].children=0;
{
int post_order( MergeTree* Tz, BaseNode* nodePtr, int *postOrderPtr )
{           // Post-order traverse consolidated tree (rooted in nodePtr) and
    int ichild, leftMost, leftLeftMost;    //build normal form in mrgTree
    if( nodePtr->children > 0 )   {        /* Not leaf node                          */
        leftLeftMost = post_order( Tz, nodePtr->child[0], postOrderPtr );
        for ( ichild = 1; ichild < nodePtr->children; ichild++) {
            leftMost = post_order( Tz, nodePtr->child[ichild], postOrderPtr );
            Tz->comp_set[ Tz->setsz++] = *postOrderPtr;     /* Add to the            */
        }                                                    /* tree's non-leftMost nodes list */
        *postOrderPtr += 1;
        init_node( Tz, *postOrderPtr, *nodePtr, leftLeftMost );
        return( leftLeftMost );
        { else {                           /* If leaf node, leftMost is post order no of self */
            *postOrderPtr += 1;
            init_node( Tz, *postOrderPtr, *nodePtr, *postOrderPtr );
            return( *postOrderPtr );
        }
    }
}
void normalise_tree( MergeTree* T, MergeTree* mT )     /* After consolidation       */
{                                          /* the interlinked parts of the consolidated     */
    BaseNode* topNodePtr;                  /* trees (now collectively called tree T) are     */
    int postorderNo, leftMostNo;           /* moved into a new; self-contained,              */
                                           /* "normal" tree                                   */
    initialise_tree(T, mT);                /* Initialise mT from T                            */
    topNodePtr = (BaseNode*)&T->n[T->treesz];
    postOrderNo = leftMostNo = 0;
    leftMostNo = post_order ( mT, topNodePtr, &postOrderNo );      /* Build          */
                                           /*  new normal tree Z from top node of tree A    */
    mT->comp_set[ mT->setsz ] = postOrderNo;    /* Add root to the tree's non-              */
    mT->treesz = 0 postOrderNo;                 /* leftMost nodes list                      */
}
extern void connect_mapped_subtree( int mm );
int merge_unmapped_subtree( int srcSubTree, int lastMappedMrgNode ) {
    int mm_entry;       // Merge top of unmapped srcSubTree into mrgTree above
    int srcChild, mrgChild, mrgChildSubTree, srcLower, mrgLower;   // the least
    int ichild, closestMapping, mappedsubTreeLeftmost, mapped_node_found;
    BaseNode* mrgLca;   // common ancestor in lastMappedMrgNode. The children
                        // are dealt with recursively.
    mapped_node_found = 0;
    if ( srcSubTree != T->n[srcSubTree].leftmost )   {   // If srcSubTree is not a
                                                          // leaf
        for( mm_entry = M.q_length-1;      // Bypass mappings "to right of" ( > )
             mm_entry >= 0                  // srcSubTree
             &&
             (srcChild = getQentry( &M, mm_entry, SRCTREE))    > srcSubTree;
```

-continued

APPENDIX B

```
            mm_entry-- )         // (srcSubTree is itself unmapped)
          { };
          if (mm_entry >= 0 && srcChild >= T->n[srcSubTree].leftmost ) {   // If
                // mapping exists inside (>= left-most node of) srcSubTree
            mrgLca = (BaseNode*)0; // Initialise the mrgTree insertion point
                // NB: This assumes a one-to-one correspondence of children
                // indexes between srcTree and mrgTree!
                // This may not hold if mrgMap has taken on additional
                // children as a consequence of earlier mergings which
                // involve the adoption of complete unmapped subtrees as
                // additional children. (see code in connect_mapped_subtree)
            ichild = T->n[srcSubTree].parent->WhichChild( &T->n[srcSubTree]);
                // NB: leftmost-1 is a way of getting the next sibling, if
                // there is one ...
            mrgChildSubTree = (ichild == mT->n[lastMappedMrgNode] .children-1) ?
lastMappedMrgNode-1 : mT->n[lastMappedMrgNode].child[ichild+1]->leftmost-1;
            while ( mm_entry >= 0 && srcChild >= T->n[srcSubTree].leftmost ) {
                // For mappings inside: ie. >= left-most node of
                // srcSubTree
              mrgChild = getQentry( &M, mm_entry, MRGTREE);
              connect_mapped_subtree ( mm_entry );
                // Process this mapped subtree (and its children)
                // Here follows a really convoluted way of determining
                // whether the mrgTree side of a mapping is within the
                // corresponding srcSubTree child of lastMappedMrgNode
                // We also climb the mrgTree to find the least common
                // ancestor of the contained mappings to use as a
                // insertion point for the unmapped srcTree nodes.
              if ( (mrgchild >= mT->n[lastMappedMrgNode].child[ichild]-
>leftmost) && (mrgChild <= mrgChildSubTree)    ) {
                if( !mrgLca ) {
                   mrgLca = &mT->n[mrgChild];
                       // Intialize mrgLca on first 'contained'
                       // mapping
                   mapped_node_found = TRUE;
                       // Only if mapping occurs within the subtree
                       // of srcMap
                   closestMapping = 0 mm_entry;
                 else if ( mT->n[mrgChild].leftmost < mrgLca-leftmost){
                       // Else if mapping lies "to the left" of
                       // mrgLca's subtree
                   srcChild = getQentry( &M, closestMapping,SRCTREE);
                   unlink_mapped_child( T, srcChild );
                       // Unlink obsolete insertion point, in
                       // closestMapping, from srcSubTree
                   while(mT->n[mrgChild].leftmost < mrgLca-leftmost) {
                       // Now climb the parent link until
                       // mapping is contained
                     mrgLca = mrgLca->parent;
                       // Should never get above
                       // lastMappedMrgNode !!!!!
                     closestMapping = 0 mm_entry;
                       // remember mapping entry for later
                   }
                } else {
                   unlinkmapped_child( T, srcChild );
                       // Else mapping is already contained
                       // in mrgLca
                }
              } else {
                   unlinkmapped_child( T, srcChild );         // Else
                       // mapping falls completely outside
                       // the corresponding child of
                       // lastMappedMrgNode
              }
                       // Now skip mappings subsumed by srcChild (
              mappedSubTreeLeftmost = T->n[srcChild].leftmost;
              while ( mm_entry >= 0 && (srcChild = getQentry( &M, mm_entry,
SRCTREE)) >= mappedSubTreeLeftmost ) {
                   mm_entry--;        // i.e those already processed earlier
              }                       // within connect_mapped_subtree
            } /* while */
          } /* if */
          // Whew! We've found the point where srcChild should be inserted, and have //
          unlinked all subTree mapped elements except
          // the one which represents where the bottom of this unmapped subtree is to
          // be linked;
```

APPENDIX B

```
// Now link in srcChild *above* mrgLca to wit:
    mrgLca->parent->child[ichild] = &T->n[srcSubTree];      // Replace mrgLca's
                    // parent's ichild link with link to top of unmapped subtree
    T->n[srcSubTree].parent = mrgLca->parent;      // Set top of
                    // unmapped subtree (srcSubTree) to point to mrgLca's parent
    srcLower = 0 getQentry( &M, closestMapping, SRCTREE);      // Re-retrieve
                    // nodes of closestMapping
    mrgLower = getQentry( &M, closestMapping, MRGTREE);
    ichild = T->n[srcLower].parent->WhichChild( &T ->n[srcLower] );
                    // Identify which child link of the selected
                    // lower mapped node in srcTree(T)
    if ( ichild == -1 ) {
        // This child (srcLower) may have already been unlinked if it was
        // mapped/merged to a node in the mrgTree (mrgLower) which was child-
        // numbered differently than that of srcLower. In this case we
        // should link the bottom of the unmapped subtree into the remaining
        // child (which, in the case of binary trees should be the
        // correct child). Note: Don't worry, the <map> process will
        // restore the cross-subtree links.
        ichild = T->n(srcLower).parent->children - 1
    T->n[srcLower].parent->child[ichild] = mrgLca;      // Should be used to link
            // into the corresponding mapped mrgTree (mT) node - NB:
            // This unlinks srcLower The mrgLca should adopt
    mrgLca->parent = T->n[srcLower].parent;      // what ever srcLower's
                                                 // parent was
    } /* if not a leaf node */
    return mapped_node_found;
}
void connect_mapped_subtree( int mm_entry )      // For nodes in srcTree
{       //   which have been already mapped, copy label to mapped node in
    int nT, nmT, nTchild, nmTchild;      // mrgTree and adopt any unmapped children
    int i, ichild, itype;
    int contains_mapped_node;      // If non-zero, contains the left_most
                                    // mapped mrgTree node found within an
                                    // unmapped portion of SrcTree
    nT = getQentry( &M, mm_entry, SRCTREE);      // Retrieve node numbers from
    nmT = getQentry( &M, mm_entry, MRGTREE);      // mapped node queue
    nTchild = nT-1;                              // Get rightmost child of mapped srcTree node
    nmTchild = nmT-1;                            // Setup index of child that nTchild is to nT
    strcat ( mT->n[nmT].nodename,    T->n[nT].nodename );
    strcat ( mT->n[nmT].nodelabel,   T->n[nT].nodelabel );
    strcat ( mT->n[ntnT].origin,     T->n[nT].origin);
    strcat( mT->n[nmT].childnumber, T->n[nT].childnumber);
    if( mT->n[nmT].type[0] != isNothing ) {      // Append any values if existing
        for ( itype=0; mT->n[nmT].type[itype]   != isNothing; itype++) {}; i=0;
        do {    mT->n[nmT].type[itype]= T->n[nT].type[i];
            mT->n[nmT].value[itype++] = T->n[nT].value[i++];
        } while ( T->n[nT].type[i]   != 2 isNothing );
        mT->n[nmT].type[itype]= isNothing;
    }
    ichild = T->n[nT].children-1;
    while ( ichild >= 0 )   {                 // Link in all children of nT
        mm_entry = inQ( &M, nTchild, SRCTREE );
        if ( mm_entry >= 0 )    {             // Not mapped if mm_entry == -1
            connect_mapped_subtree( mm_entry );      // Mapped nodes are already part
        } else {                                     // of mT's tree structure
            assert (ichild>=0);
            contains_mapped_node = merge_unmapped_subtree( nTchild, nmT );   // Look
                    // for mapped nodes in unmapped srcTree under nTchild subtree
            if (!contains_mapped_node) {         // Adopt any unmapped srcSubTrees as
                                                 // an additional child - NB: This
                mT->n[nmT].child[mT->n[nmT].children++] = &T->n[nTchild];
                T->n[nTchild].parent = &mT->n[nmT];          // policy may create
            }                                     // problems in merge_unmapped_subtree (an alternate
        }                                     // policy might be to insert it in the ichild link)
        nTchild = T->n[nTchild].leftmost-1;      // Get next sibling
        ichild--;
    }
}
#ifdef MERGEDEBUG
extern void printTree(int iTree);
#endif
void consolidate_tree( SrcTree* T, MergeTree*.mT)      // Consolidate(ie link in)
{       //      unmapped elements of tree T to merge tree mT.
    T ->LinkSubTree( T->treesz );      // Superimpose a linked structure on the
    mT->LinkSubTree( mT->treesz );     // 'normalised' form to enable merging and //
                                        restructuring/normalisation later.
```

APPENDIX B

```
*ifdef MERGEDEBUG
    printf("Candiate Tree:\n-------------------------\n"};
    T->PrintTree ( );
    printf("Initial Target Tree:\ --------------------------------\n");
    mT->PrintTree( );
#endif
    strcat(mT->treename, "|") ; strcat(mT->treename, T->treename );
    strcat(mt->treelabel, ":") ; strcat(mT->treelabel, T->treelabel );
    strncat(mT->numID, &T->numID, 1); // T->numID is a scalar, strcat null-
terminates numID
    connect_mapped_subtree( M.g_length-1 ).;         /* start with the highest        */
                                                     /* mapping in the tree           */
#ifdef MERGEDEBUG
    printf("Consolidated Unormalised Tree:\n------------------\n");
    mT->PrintTree ( );
#endif
}
int find_index( char *candidate )     // Match the tree name to obtain tree
{                                     /* structure index                              */
    int i;
    for ( i= 0; i<treenum; i++) {
       if ( ! strcmp( trees[i]->treename, candidate ) ) {
          return(i);
       }
    }
    printf("Unable to locate tree labeled: %s in trees\n",candidate);
    exit (37)
    return(0);      /* This return is to passify the compiler... */
}
int get_largest_tree( )     /* Select from Candidates the largest tree      */
{
    int i, iTree ,maxTree;
    int max_treesz= 0;
    for ( i= 0; i<Candidatenum; i++) {
       iTree = find_index( Candidates[i] );
       assert (iTree>= 0);
       if (trees[iTree]->treesz > max_treesz) {
          max_treesz = trees[iTree]->treesz;
          maxTree = iTree;
       }
    }
    return(maxTree);
{/* get_largest_tree */
void merge ( )        /* Given a set of candidates build a merged tree       */
{
    int iTc, icand, iCandidate;
    MergeTree *mThold, *mTtemp;
    MrgTree[0].StaticInit(TREE_SIZE*2, treenum);
    MrgTree[0].BaseTree::StaticInit( TREE_SIZE*2, TREE_NAME_LENGTH,
TREE_LABEL_LENGTH, treenum );
    MrgTree[1].StaticInit(TREE_SIZE*2, treenum);
    MrgTree[1].BaseTree::StaticInit( TREE_SIZE*2, TREE_NAME_LENGTH,
TREE_LABEL_LENGTH, treenum );
    mThold = &MrgTree[1];    /* Normalisation is into the larger merge tree   */
    mT = &MrgTree [0];       /* structure                                     */
    iCandidate = get_largest_tree( );     /* Select largest candidate as      */
                                          /* starting point                   */
    *mT = *trees[icandidate];             /* and copy it into the merge       */
                                          /* tree structure.                  */
    for ( icand= 0; icand < Candidatenum; icand++)   {  /* Compute distance, map  */
       iTc = find_index( Candidates[icand]);          /* consolidate, and       */
                                          */    renormalise all trees in class. */
       if (iTc == iCandidate) continue;   /* skip initial starting point tree  */
       T = trees [iTc];
       tree_dist( T, mT );
       mapping( T, T->treesz, mT, mT->treesz );
       consolidate_tree( T, mT );         /* Merge tree T into tree mT.        */
       normalise_tree( mT, mThold);       /*Convert merged tree to post_order, */
       mThold->numTreesContained++;       /* normalised form.                  */
#ifdef MERGEDEBUG
    printf("Consolidated Normalised Tree:\n-----------------\n");
    mThold->PrintTree ( );
#endif
    mTtemp = mT;             /* Swap working merge trees.                     */
    mT = mThold;
    mThold = mTtemp;
    }/*foreach tree*/
```

-continued

APPENDIX B

```
mT->LinkSubTree( mT->treesz );
mT->DumpTree( );          // Output final merged tree in expanded
                          // format for use in GUI
mT->PutTree( );           // Output final merged tree in compacted
                          // format for use in final mapping <maptree>
} /* merge */
```

What is claimed is:

1. A method of compiling source code to a primary and a secondary processor, comprising:
   selective extraction of dataflows from the source code;
   transformation of the extracted dataflows into trees;
   matching of the trees against each other to determine minimum edit cost relationships for transformation of one tree into another;
   determining a group or a plurality of groups of dataflows on the basis of said minimum edit cost relationships and creating for each group a generic dataflow capable of supporting each dataflow in that group;
   using the generic dataflow or dataflows to determine the hardware configuration of the secondary processor; and
   substituting into the source code calls to the secondary processor for said group or plurality of groups of dataflows, and compiling the resultant source code to the primary processor.

2. A method as claimed in claim 1, wherein said minimum edit cost relationships are embodied in a taxonomy of minimum edit distances for classification of the trees.

3. A method as claimed in claim 1, wherein said minimum edit cost relationships are determined according to the architecture of the secondary processor, and represent a hardware cost of a corresponding reconfiguration of the secondary processor.

4. A method as claimed in claim 1, wherein the hardware configuration of the secondary processor allows for reconfiguration of the secondary processor during execution of the source code.

5. A method as claimed in claim 4, wherein the secondary processor is an application specific instruction processor.

6. A method as claimed in claim 4, wherein the secondary processor is a field programmable gate array.

7. A method as claimed in claim 4, wherein the secondary processor is a field programmable arithmetic array.

8. A method as claimed in any of claims 4, wherein reconfiguration of the secondary processor is required during execution of the source code to support each dataflow in the group supported by a generic dataflow.

9. A method as claimed in claim 1, wherein a generic dataflow of a group is calculated by an approximate mapping of dataflows in the group on to each other, followed by a merge operation.

10. A method as claimed in claim 9, wherein the dataflows are provided as directed acyclical graphs and are reduced to trees by removal of any links in the directed acyclical graphs not present in a critical path between a leaf node and the root of a directed acyclical graph.

11. A method as claimed in claim 10, wherein the critical path is a path between two nodes which passes through the largest number of intermediate nodes.

12. A method as claimed in claim 10, wherein the critical path is a path between two nodes with the greatest accumulated execution time.

13. A method as claimed in claim 10, wherein after the creation of a generic dataflow, the generic dataflow is compared with furthers dataflows extracted from the source code, wherein those of said further dataflows which match sufficiently closely the generic dataflow are added to the generic dataflow.

14. A method as claimed in claim 10, wherein the removed links are stored after the directed acyclical graphs are reduced to trees and are reinserted into the generic dataflow after the merging of the trees of the group into the generic dataflow.

15. A computer programmed to compile source code to a primary and a secondary processor, comprising:
   means to selectively extract dataflows from the source code;
   means to transform the extracted dataflows into trees;
   means for matching the trees against each other to determine minimum edit cost relationships for transformation of one tree into another;
   means for determining a group or a plurality of groups of dataflows on the basis of said minimum edit cost relationships and creating for each group a generic dataflow capable of supporting each dataflow in that group;
   means for using the generic dataflow or dataflows to determine the hardware configuration of the secondary processor; and
   means for substituting into the source code calls to the secondary processor for said group or plurality of groups of dataflows, and for compiling the resultant source code to the primary processor.

16. A computer as claimed in claim 15, wherein said minimum edit cost relationships are embodied in a taxonomy of minimum edit distances for classification of the trees.

17. A computer as claimed in claim 15, wherein said minimum edit cost relationships are determined according to the architecture of the secondary processor, and represent a hardware cost of a corresponding reconfiguration of the secondary processor.

18. A computer as claimed in claim 15, wherein the hardware configuration of the secondary processor allows for reconfiguration of the secondary processor during execution of the source code.

19. A program storage medium readable by a computer, tangibly embodying a program of instructions executable by the computer to perform method steps for compiling source code to a primary and a secondary processor, said method steps comprising:
   selective extraction of dataflows from the source code;
   transformation of the extracted dataflows into trees;
   matching of the trees against each other to determine minimum edit cost relationships for transformation of one tree into another;

determining a group or a plurality of groups of dataflows on the basis of said minimum edit cost relationships and creating for each group a generic dataflow capable of supporting each dataflow in that group;

using the generic dataflow or dataflows to determine the hardware configuration of the secondary processor; and substituting into the source code calls to the secondary processor for said group or plurality of groups of dataflows, and compiling the resultant source code to the primary processor.

* * * * *